United States Patent [19]

Ramer

[11] Patent Number: 4,679,893

[45] Date of Patent: Jul. 14, 1987

[54] HIGH SWITCHING FREQUENCY OPTICAL WAVEGUIDE SWITCH, MODULATOR, AND FILTER DEVICES

[75] Inventor: O. Glenn Ramer, Los Angeles, Calif.

[73] Assignee: Hughes Aircraft Company, Los Angeles, Calif.

[21] Appl. No.: 852,081

[22] Filed: Apr. 14, 1986

Related U.S. Application Data

[63] Continuation of Ser. No. 527,149, Aug. 26, 1983.

[51] Int. Cl.$^4$ ................................................ G02B 6/10
[52] U.S. Cl. ............................. 350/96.14; 350/96.13
[58] Field of Search ................. 350/96.12, 96.13, 96.14

[56] References Cited

U.S. PATENT DOCUMENTS

| | | | |
|---|---|---|---|
| 4,008,947 | 2/1977 | Baües et al. | 350/96.14 |
| 4,142,775 | 3/1979 | Ramaswamy et al. | 350/96.14 |
| 4,146,297 | 3/1979 | Alferness et al. | 350/96.14 |
| 4,243,295 | 1/1981 | Alferness | 350/96.14 |
| 4,262,993 | 4/1981 | Burns et al. | 350/96.14 |
| 4,291,339 | 9/1981 | Giallorenzi et al. | 350/96.14 |
| 4,390,236 | 6/1983 | Alferness | 350/96.14 |

FOREIGN PATENT DOCUMENTS 2095419 9/1982 United Kingdom.

OTHER PUBLICATIONS

C. M. Gee, et al, Applied Optics, vol. 22, No. 13, Jul. 1983 (New York, US): "Traveling-Wave Electrooptic Modulator", see pp. 2034–2037, in particular FIG. 1.
M. Izutsu, et al, IEEE Journal of Quantum Electronics, vol. QE-14, No. 6, Jun. 1978 (New York, US): 10 GH$_z$ bandwidth traveling-wave.
"LiNbO3 Optical Waveguide Modulator", see pp. 394–395, in particular FIG. 1 (cited in the application).

*Primary Examiner*—William L. Sikes
*Assistant Examiner*—Akm E. Ullah
*Attorney, Agent, or Firm*—V. D. Duraiswamy; A. W. Karambelas

[57] ABSTRACT

An optical device, capable of being variously optimized so as to have the characteristics of a switch, modulator, and filter, is disclosed. The device is obtained by providing first and second optical channel waveguides generally parallel one another at a surface of an electro-optic substrate, the waveguides being optically coupled in first and third regions of the device and essentially optically separated in an interposed second region, first, second, and third electrode sets being associated with the waveguides in the first, second, and third regions, respectively, the first and third electrode sets being biased so as to each transfer light of a given frequency bandwidth between the first and second waveguides, the second electrode set being biased so as to provide a relative phase difference between light present in each of the waveguides within the second region. This allows light entering the first region in the first waveguide to be partially transferred to the second waveguide in the first region, a relative phase shift to be introduced in the second region between the light in the first and second waveguides, the degree of relative phase shift being directly dependent on a signal applied to the second set of electrodes, and additional light to be transferred between the first and second waveguides in the third region, the direction and magnitude of the transfer being directly dependent on the relative phase shift between the light present in the first and second waveguides.

17 Claims, 9 Drawing Figures

HIGH SWITCHING FREQUENCY OPTICAL WAVEGUIDE SWITCH, MODULATOR, AND FILTER DEVICES

This application is a continuation of application Ser. No. 527,149, filed Aug. 26, 1983.

BACKGROUND OF THE INVENTION

1. Field of the Invention

The present invention generally relates to optical waveguide devices and in particular to an optical device capable of being optimized to function as a broad frequency band optical switch in one embodiment and a narrow pass-band optical filter in a second embodiment, both embodiments being capable of light intensity modulation and of being switched between parallel and cross states at switching frequencies ranging from dc to high microwave.

2. Description of the Prior Art

The development of optical communication systems, and in particular optical fiber communication systems, have progressed rapidly in the last few years. In these systems, the concept of integrated optics has been rapidly developed wherein the processing of an optical signal is accomplished by semiconductor integrated circuits. A typical system can comprise a semiconductor laser formed on a chip substrate, and various switches, filters, amplifiers and coupling elements all formed on the same chip. Many systems may also include single mode optical fibers which are coupled to channel waveguides formed on the chip substrate. Thus, several integrated optical switches and filters can be used on the same chip for flexibly multiplexing, switching, and demultiplexing different wavelengths in an optical systems, such as an optical fiber communication network.

A prior art technique for providing an optical filter and which is capable of operating as an optical multiplexer/demultiplexer is disclosed in U.S. Pat. No. 4,146,297 to Alferness et al. The Alferness et al patent discloses an integrated optical filter composed of non-identical strip waveguides in LiNbO$_3$. The center filter frequency of the device is tunable over a wavelength difference of several hundred angstroms and electrical control of the crossover switching efficiency is provided. Although the optical filter described in Alferness et al performs very satisfactorily, the bandwidth, with respect to the crossover efficiency, is relatively broad and the sidelobe characteristic of the filter is larger than desired. What is desired therefore is to provide an optical filter generally of the type disclosed in the Alferness et al patent but with the bandwidth narrowed and the sidelobes reduced. This, in turn, will reduce the noise and optical cross talk level of the device, thus enhancing the optical filter characteristics of the device.

For integrated optical switches, there are several important operating parameters: switching voltage and power, optical cross talk, switching speed, and optical loss. If significant optical cross talk can be tolerated and high data rates (greater than 1 GHz) are required, then a simple directional coupler such as that disclosed in the article of Izutsu et al, "1 GHz Bandwidth Traveling-Wave LiNbO$_3$ Optical Waveguide Modulator," IEEE Journal Quantum Electronics, Vol. QE-14, p.394, 1978, can be utilized with a traveling wave switch control signal source. However, if low cross talk (less than −20 db) is required, data rates must be reduced to less than one GHz and a $\Delta\beta$ reversal switch, such as disclosed in the article of Kogelnik et al, "IEEE Journal Quantum Electronics, Vol. QE-12 p.396, 1976, must typically be used. U.S. Pat. No. 4,262,993 to Burns et al is illustrative of an alternating $\Delta\beta$ switch having sets of electrodes and waveguides formed on a crystalline substrate, the substrate being formed in abutting sections. Although the abutting sections reduce the voltages required for switching, the fabrication process required is complex and relatively expensive. U.S. Pat. No. 4,012,113 to Kogelnik et al describes an optical switch provided with means for adjusting the crossover and parallel states. The driving electrodes may be split into two or more sequential sections to allow for electrical adjustability of the cross state. However, the switch described in the above patent is a modified $\Delta\beta$ reversal switch and is thus similarly limited with respect to switching speeds, i.e, to less than approximately 1 GHz. It would be desired if an optical switch could be provided wherein low cross talk (comparable to the prior art $\Delta\beta$ reversal switch) and high switching speeds, as is available on devices utilizing traveling wave interaction, could be provided.

SUMMARY OF THE INVENTION

The present invention overcomes the various disadvantages and limitations of prior art optical filters and switches by providing an integrated optical device that can be suitably optimized to operate as a wide bandwidth optical switch in one embodiment and as a narrow pass band optical filter in a second embodiment, both of which are capable of light intensity modulation and, further, can be switched between optical parallel and cross states at frequencies ranging from dc to high microwave.

This is accomplished in the present invention by providing in an electro-optic substrate first and second optical channel waveguides generally parallel one another, the waveguides being optically coupled in first and third regions and essentially optically separated in an interposed second region, first, second, and third electrode sets being associated with the waveguides in said first, second, and third regions respectively, the first and third electrode sets being biased so as to each transfer light of a given frequency bandwidth between the respective portions of the first and second waveguides, the second electrode set being biased so as to provide a selectable relative phase difference between the light present in each of the waveguides within the second region. This allows light entering the first region in the first waveguide to be partially transferred to the second waveguide in the first region, a relative phase difference to be introduced in the second region between the light in the first and second waveguides, the degree of phase difference being directly dependent on a signal applied to the second set of electrodes, and additional light to be transferred between the first and second waveguides in the third region, the direction and magnitude of the transfer being directly dependent on the relative phase difference between the light present in the first and second waveguides.

Thus, an advantage of the present invention is that light can be smoothly switched between two optical channel waveguides in direct response to a signal applied to an optical control element electrode.

Another advantage of the present invention is that the control element electrode to which the signal is applied may be configured as a traveling wave electrode element, permitting the device to be switched at frequencies ranging from dc to high microwave.

A further advantage of the present invention is that the switching capability of the device is provided while incurring a minimum of cross talk.

Still another advantage of the present invention is that it may be flexibly optimized as a wide bandwidth optical switch and as an adjustable center frequency, relatively very narrow bandwidth optical switch, particularly suitable for use as an optical filter, all embodiments having high optical efficiency in switching between optical parallel and cross states.

A still further advantage of the present invention is that it may be adaptively configured and optimized so as to be responsive to an applied switch control signal within a given voltage potential range at frequencies ranging from dc to high microwave.

Yet still another advantage of the present invention is that its fabrication requires only standard processing techniques and can be performed in a cost effective manner.

BRIEF DESCRIPTION OF THE DRAWINGS

For a better understanding of the invention as well as other advantages and further features thereof, reference is made to the following description which is to be read in conjunction with the accompanying drawings wherein like reference numerals identify like components in each of the figures and wherein:

FIG. 2b is a top view of an alternate electrode configuration embodiment of the optical device of FIG. 2a;

DETAILED DESCRIPTION OF THE INVENTION

In order to place the present invention in proper perspective, a discussion of the Alferness et al device and the manner of its operation will be set forth below. Prefatory to this discussion it should be understood that this prior art device is an optical filter that can be electrically actuated at relatively high frequencies (approximately <1 GHz) to switch light from one optical waveguide to another, i.e., from "parallel state" where no light is switched to "cross state" where the filtered light is switched. As will be explained in greater detail below, the filter function, bandwidth and center frequency is inherently related to the relative dimensions and corresponding optical properties of the waveguides. In the particular circumstance where the dimensions and properties of the waveguides are essentially identical, the device will operate simply as a switch, largely independent of light frequency within a large bandwidth range. As the relative dimensions and corresponding optical properties increasingly differ between the waveguides, the optical filter bandwidth narrows about a center frequency. With this understanding, it should be noted that a portion of the present invention operates substantially similar to the Alferness et al device. Thus, the specific details of performance disclosed in Alferness et al necessary for an understanding of the present invention are incorporated herein by reference.

Figure 1A:
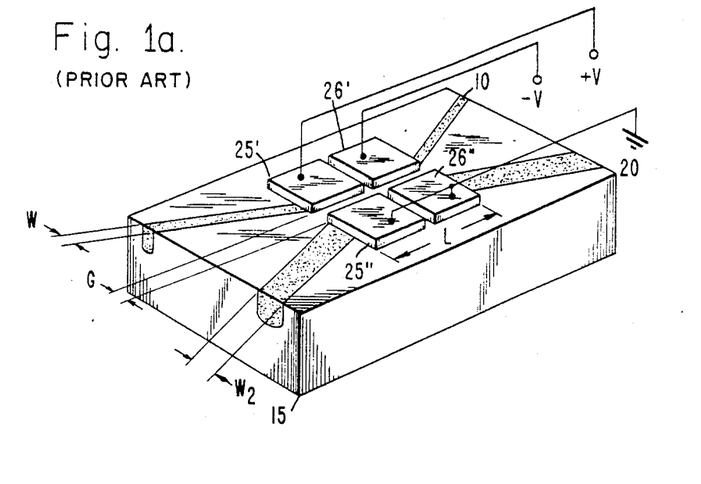
FIG. 1a is a perspective view of a prior art optical device consistent with that disclosed in the above-identified Alferness et al patent.

Referring now to FIG. 1, the prior art device 8 comprises two waveguides 10 and 20 established in a lithium niobate electro-optic substrate 15. The waveguides 10 and 20 are of different widths $W_1$ and $W_2$, respectively, and are caused to be proximate to each other at a gap G for a predetermined interaction length L. The waveguides 10, 20 can be formed in the lithium niobate substrate by first depositing titanium metal of thickness $\tau_1$ in two different widths $W_1$ and $W_2$ along paths of the desired waveguides on a Z-cut surface using conventional masking photolithography techniques. The narrower titanium strip having width $W_1$ is then masked-off with photoresist and the titanium metal previously deposited corresponding to the intended wider guide is ion beam etched down to a thinner thickness $\tau_2$. The titanium is then diffused into the lithium niobate at 980° C. for six hours to form the waveguides. Because the metal thickness corresponding to the intended wider guide is less than that of the narrower guide, the wider guide ultimately has a smaller intrinsic substrate-to-guide refractive index difference, $\Delta n_2$, compared with that of the narrower guide, $\Delta n_1$. As a result, the guides have different dispersion relations with respect to wavelength.

Figure 1B:
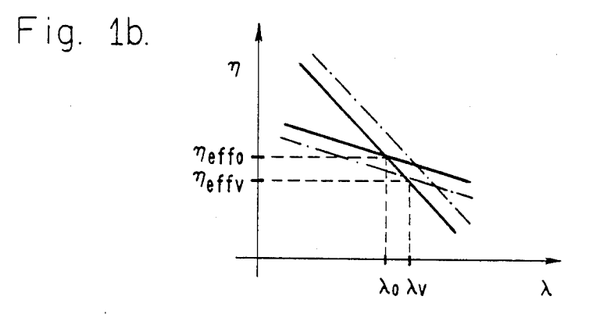
FIG. 1b and 1c are graphs showing the relative relation of the effective index of refraction with frequency for the optical channel waveguides of different dimensions and of substantially identical dimensions, respectively.

As indicated in FIG. 1b the effective index of refraction of the two guides 10 and 20 are equal at only one wavelength, $\lambda_0$. It is only near this phasematch wavelength that energy is coherently coupled from one guide into the other (crossover). At wavelengths other than the phasematch value the energy cannot coherently couple as strongly because of the difference in propagation velocities, though these wavelengths will couple to some degree depending on the filter characteristics of the device 8. A typical device has width $W_1$ equal to 1.5 micrometers and a width $W_2$ equal to 3 micrometers with an interaction length L equal to 1 centimeter and a gap G equal to 4 micrometers. The thickness of deposits of titanium metal were typically equal to 500 Å for the narrow waveguide and 350 Å for the wider waveguide.

In order to provide electrical adjustment of the center wavelength $\lambda_0$, two pairs of electrodes 25 and 26 are deposited over both waveguides 10 and 20. Each electrode pair has one of its electrodes (25' and 26') positioned over the narrow waveguide 10 in the interaction length region and its other electrode (25" and 26") positioned over the wider electrode. The respective electrode pairs are also positioned in juxtaposition such that a potential applied to either one of the electrode pairs causes an electric field in one of the waveguides opposite in direction to the electric field established by the electrode pair. As a result equal but opposite potentials can be applied across the electrode pairs thereby causing a change in the dispersive relation versus wavelength for both of the waveguides. By applying a potential of magnitude V across both of the electrode pairs, the curves of effective index of the other guide are caused to decrease at that wavelength. The overall result is that the new dispersive relations corresponding to the condition which exists when a potential V is applied to each of the electrode pairs intersect at a new wavelength $\lambda_V$, as shown in FIG. 1b. Accordingly, the filter response characteristics is shifted so that its filter center wavelength corresponding to maximum crossover efficiency now occurs at the wavelength $\lambda_V$.

The electro-optic induced fractional shift of the center wavelength $|\lambda_0 - \lambda_V|/\lambda_0$ is determined by the voltage induced fractional change in $(\Delta n_1 - \Delta n_2)$. This latter difference for waveguides in lithium niobate is typically small, on the order of $5 \times 10^{-3}$. Changes of this magnitude can be achieved through the linear electro-optic effect with reasonable voltages.

The crossover efficiency can be increased at any of the center wavelengths to approximately 100%. This feature is a consequence of the split electrode configuration, characteristic of $\Delta \beta$ reversal devices. After electrically tuning a given filter to achieve a desired center (phase match) wavelength by applying equal but opposite magnitude potentials across each of the electrode pairs, the potential on each of the electrode pairs is perturbed or changed by a substantially equal and opposite amount relative to the other electrode pair. If the amount of voltage change is represented by V', the voltage $V_1$ on one of the electrode pairs is caused to be equal to $V+V'$ and the voltage on the other electrode pair $V_2$ is caused to equal to $V-V'$. Application of these perturbed voltages on each of the electrode pairs 25 and 26 permits substantially complete crossover providing that the interaction length L is greater than one and less than three coupling lengths. Under these conditions, essentially one half of the light will have been transferred to the other waveguide by the time the light reaches the mid-point of the device. The actual value of V' depends upon the length L and the strength of optical coupling between the waveguides.

Figure 1C:
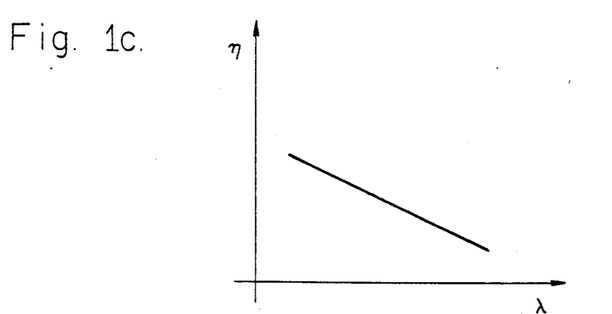

The foregoing applies, with one exception, to the situation wherein the dimensions and corresponding optical properties of the two waveguides are essentially identical. As indicated in FIG. 1c, the changes in the effective index of refraction with frequencies is the same for both waveguides. Thus, there is no center wavelength and phase match may occur at essentially all optical frequencies within a broad optical frequency range, as determined by the particular substrate and waveguide materials. Consequently, in this situation the device acts as a simple optical switch transferring all light from one waveguide to the other when voltage potentials consistent with the above discussion are applied.

Figure 2A:
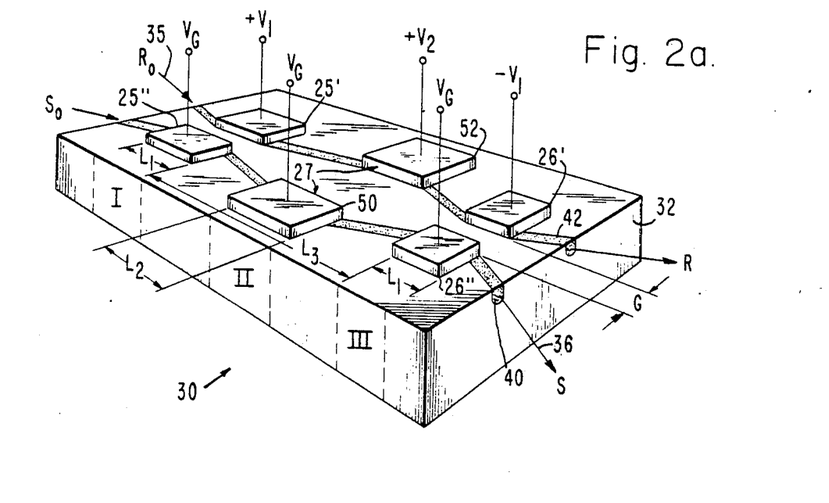
FIG. 2a is a perspective view of an optical device constructed in accordance with the present invention.
Figure 2B:
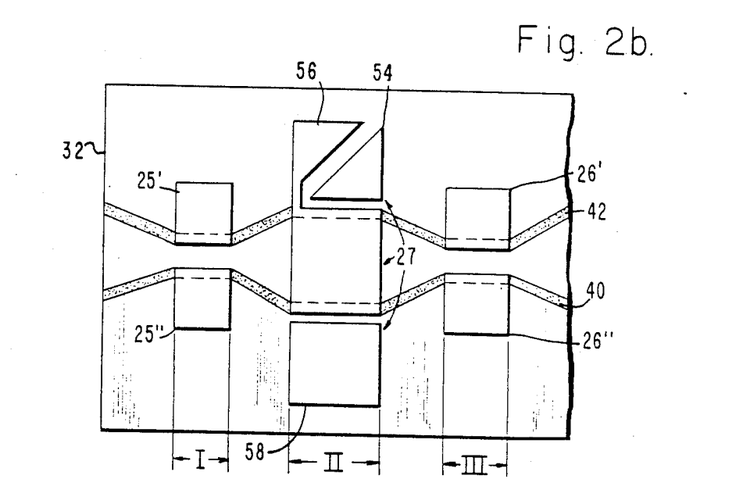

FIG. 2a shows an optical switch device 30 which comprises a first embodiment of the present invention. The basic structure of the device is generally similar to that shown in FIG. 1 except that the length $L_1$ of each of the electrode pairs 25 and 26 have been reduced to approximately one-half of the interaction length L and separated by a length $L_3$, along with their corresponding portions of the optical waveguides, so as to be within regions I and III, respectively, of the device 30. The two single mode channel waveguides 40 and 42 are of identical dimensions and dispersion characteristics and are placed in close proximity (i.e., separated by a gap G) and configured so as to run parallel over a total interaction length $2L_1 = L$ within regions I and III. An optical control element 27, comprising alternately two, as shown in FIG. 2a, and three, as shown in FIG. 2b, electrodes, 50, 52 and 54, 56, 58 respectively of length $L_2$, is provided. These electrodes are deposited on the lithium niobate substrate 32 between electrode pairs 25 and 26 overlying or associated with portions of the optical waveguides 40, 42. These waveguide portions lie within a region II of the device 30 and are spaced apart so as to be essentially optically isolated from one another, substantially as illustrated.

Considering the operation of the device 30 within regions I and III thereof consistent with the present invention, waveguide 40 normally has a phase constant $\beta_0$ which is identical to the phase constant of waveguide 42. Application of voltage $+V_1$ to electrode 25' causes the phase constant ($\beta_1$) of the waveguide portion under electrode 25' to change to a value greater than $\beta_0$ and the phase constant ($\beta_2$) of the waveguide portion under electrode 25" to a value less than $\beta_0$ such that $\beta_1 - \beta_2 > 0$. Conversely, application of voltage $-V$ to electrode 26' changes the phase constant ($\beta_1$) of the waveguide portion under electrode 26' to a value less than $\beta_0$ and the phase constant ($\beta_2$) of the waveguide portion under electrode 26" to a value greater than $\beta_0$ such that $\beta_1 - \beta_2 < 0$. For these conditions, some portion of a light beam 35 entering waveguide 42 will be coupled to waveguide 40 and exit optical switch 30 as light beam 36.

Thus, voltages $+V_1$ and $-V_1$ electro-optically (Pockels effect) control the phase constants in the respective portions of each waveguide 40 and 42. With equal magnitude and opposite polarity voltages applied to the respective electrodes 25', 26', a propagation constant mismatch $(\beta_1 - \beta_2) = \Delta \beta$ is imposed in region I of the switch, and $-\Delta \beta$ is imposed in region III. In the switch device 30 shown in FIG. 2a, a non-coupled ($\kappa = 0$) region II occurs between the two $\Delta \beta$ reversal sections. The non-coupled or optically isolated waveguide condition is preferably achieved by increasing the separation between the waveguides to between approximately 10 and 30 $\mu$m. The non-coupled condition can also be obtained by ion milling a groove between waveguides 40 and 42 in region II or by physically separating the guides. The relationship between the input (Ro, So) and output (R, S) light beam intensities is given by the following coupled mode equations for device 30:

$$\begin{pmatrix} R \\ S \end{pmatrix} = \begin{pmatrix} C & -jD \\ -jD^* & C^* \end{pmatrix} \begin{pmatrix} Ro \\ So \end{pmatrix} ; \text{thus} \quad (1)$$

$$R = CRo - jDSo, \text{ and} \quad (2)$$

$$S = -jD^*Ro + C^*So, \text{ wherein} \quad (3)$$

$$C = A_1 A_1^* A_2 - B_1 B_1^* A_2^*; \quad (4)$$

$$D = 2A_1^* B_1 \cos L_2 \delta_2; \quad (5)$$

$$A_1 = \cos[L_1 \sqrt{\kappa^2 + \delta^2}] + j \frac{\delta \sin[L_1 \sqrt{\kappa^2 + \delta^2}]}{\sqrt{\kappa^2 + \delta^2}}; \quad (6)$$

$$B_1 = \frac{\kappa \sin L_1 \sqrt{\kappa^2 + \delta^2}}{\sqrt{\kappa^2 + \delta^2}}; \text{ and} \quad (7)$$

$$A_2 = \cos L_2\delta_2 + j \sin L_2\delta_2 = \exp(jL_2\delta_2); \qquad (8)$$

and wherein $\kappa$ is the coupling coefficient in the regions I and III; $\delta$ is half the difference between the propagation constants in the sections of waveguides 40 and 42 within regions I and III due to the applied voltages, i.e., $\pm V[|\beta_1-\beta_2|/2]=\delta$, in regions I and III; $L=2L_1$ is the length of regions I and III; $L_2$ is the length of the region II electrodes; $\delta_2$ is half the difference between the propagation constants in the sections of the waveguide 40 and 42 between regions I and II due to the applied voltage $V_2$ in region II.

If $L_2\delta_2=0$ (or $\cos \delta_2 L_2 = 1$) then Equation 1 corresponds to the characteristic equations for a $\Delta\beta$ reversal switch. In general, $\delta_2 L_2$ is zero when $L_2=0$ or $V_2=0$ ($\delta_2=0$). Switch 30 operates by utilizing the $\Delta\beta$ reversal sections to obtain the cross state by varying $|V_1|$ when $V_2=0$; the parallel state is then obtained by varying $\delta_2$ (via $V_2$) until $\cos \delta_2 L_2 = 0$ ($\delta_2 L_2 = \pi/2$) and keeping $|V_1|$ constant. The parallel state can always be obtained; however, low cross talk into the cross state is dependent on $A_2=A_2^*$ (real) and $A_1A_1^*=B_1^2$. The parallel state is obtained independently of the conditions imposed on the $\Delta\beta$ sections. The voltage $V_2$ required to obtain the parallel state, typically as low as 5 V, is significantly less than the voltage required to achieve switching action by changing voltage $|V_1|$ if the optical element 27 was not included, a change of 10 V typically being required for such switching action.

Figures 3, 4:
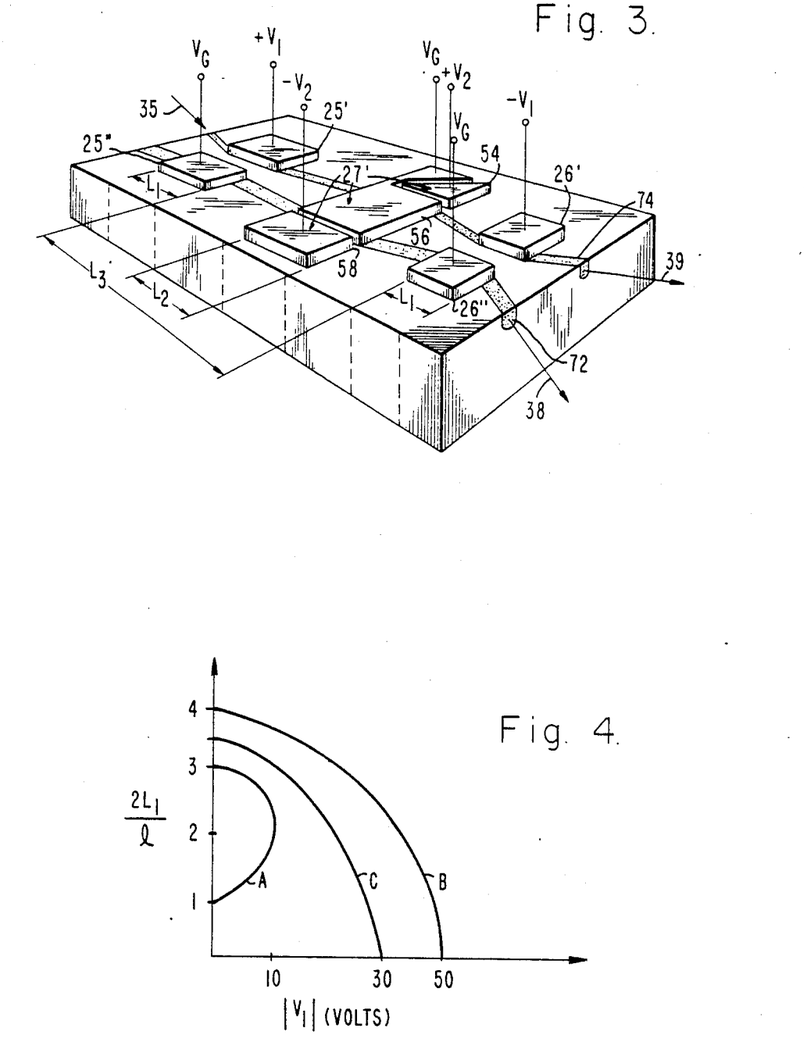
FIG. 3 is a perspective view of an optical switch constructed in accordance with a second embodiment of the present invention.
FIG. 4 is a set of curves illustrating the voltage levels required to operate the switch of FIGS. 2a, 2b, and 3.

As set forth hereinabove, if $\delta_2=0$ the optical switch 30 acts as a $\Delta\beta$ reversal switch having a cross state when $V_2=0$. The locus of points which provides the cross state when $V_2=0$ is shown in FIG. 4 as curve A as a function of voltage $|V_1|$ $2L_1/l$ (ratio of length of device electrodes 25', 26' shown in FIG. 2 to effective light coupling transfer length corresponding to complete transfer of light from one waveguide to an optically coupled adjacent waveguide, i.e., a material and dimension parameter of the particular device). The curve B shows the locus of points required to provide the parallel state when $V_2=0$ (device 30 shown in FIG. 2).

Figure 5:
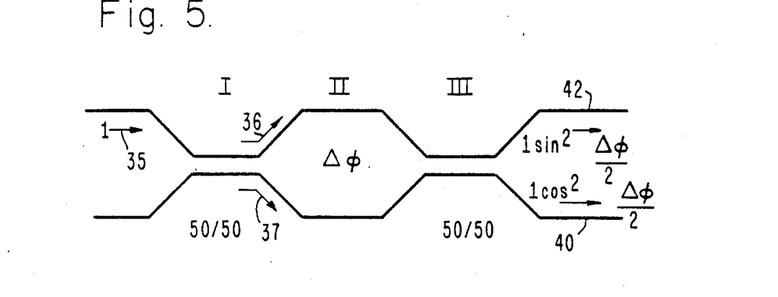
FIG. 5 is a simplified representation illustrating the operation of the optical devices shown in FIGS. 2a and b.

FIG. 5 shows in a more representational form the overall operation of the device of the present invention. If it is assumed that light beam 35 enters into waveguide 42 with an intensity of value 1 and by selecting the length of each of the electrode pairs 25 and 36 to be $L_1$, or one-half of the interaction length L shown in FIG. 1, and properly selecting the device and voltage parameters, the first electrode pair 25 acts to split an input light beam into two equal light beams 36 and 37 (a 50-50 split is preferred for optimized operation of the device 30.) A relative phase difference $\Delta\phi$ is introduced into beam 36 as it travels in waveguide 42 in region II, the optical waveguides and associated electrodes in this region operating essentially as a Mach Zehnder interferometer.

More particularly, by the application of the voltage potential between the respective electrodes of the optical control element 27, electric fields are induced in each of the waveguides 40, 42 in region II. Provided that the electric fields have opposite orientations with respect to each of the waveguides 40, 42, the dispersion characteristics of the waveguide 40, 42 are affected such that the relative phase of the light passing through region II of the device 30 is correspondingly retarded or advanced.

As the light beams 36, 37 travel through the portions of the waveguides 40, 42 associated with the electrode pair 26 of region III, light is again effectively transferred between the waveguides 40, 42. The magnitude and direction of this effective light transfer is directly dependent on the relative phase difference $\Delta\phi$ introduced in region II, with the intensity of the light emerging from waveguides 42 being given as $\sin^2 \Delta\phi/2$ and from waveguide 40 being given as $\cos^2 \Delta\phi/2$. Thus, for $\Delta\phi=0$ ($V_2=0$ for the device 30 of FIG. 2a) light of intensity value 1 emerges from waveguide 40 (cross state), while for $\Delta\phi=\pi$, where $\Delta\phi=2L_2\delta_2$ obtained by adjusting the magnitude of the voltage potential $V_2$, light of intensity value 1 will emerge from waveguide 42.

In essence, the optical switch 30 allows an incoming light beam to exit the switch in either the cross state or parallel state dependent upon the proper selection of voltages $|V_1|$ and $V_2$, such switching being substantially independent of the light beam wavelength within a broad frequency range. Further, the electrodes in region II of the switch may and, preferably, do comprise traveling wave electrodes, (the applied voltage $V_2$, being of a sufficiently high frequency, causes an electromagnetic wave to propagate down the electrode, the index of refraction of the waveguides underlying the electrode thereby varying in response to the traveling wave) thus allowing switching from the cross state to the parallel state to occur efficiently at very high frequencies. The bias voltages, $\pm V_1$, applied to the electrodes 25, 26 in regions I and III in essence set the operating point at which the optical switch 30 is in a cross state; a dc to high microwave frequency signal, $V_2$, applied to the region II traveling wave electrodes provide for the switching of input light beam between parallel and cross states, in direct response to the applied signal.

Two preferable alternate optical control element 27, 27' electrode configurations are shown in FIGS. 2a and 2b, respectively. For the control element 27 of FIG. 2a, two electrodes 50, 52 are provided, each overlying a portion of the respective waveguide 40, 42. The voltage potential of electrode 50 is preferably maintained at $V_G=0$ while the applied signal, $V_2$, is electrically coupled to electrode 52 such that $0 \le |V_2| \le |V_{max}|$ is the voltage potential necessary to induce a relative phase difference $\Delta\phi=\pi$ in light traveling through region II of the device 30.

For the optical control element 27' of FIG. 2b, the center electrode 56 of the three electrodes 54, 56, 58 overlies corresponding portions of both waveguides 40, 42 and is preferably maintained at $V_G=0$. The outer electrodes 54, 58 are narrowly spaced apart from the center electrode 56 substantially as shown. These outer electrodes are electrically connected to a differential voltage signal, $\pm V_2$, preferably such that they are maintained at equal magnitude but opposite polarity potentials proportional to the applied signal, $|V_2|$, and such that $0 \le |V_2| \le |V_{max}|$.

The difference in the configuration of the electrodes of the optical control element 27 of FIG. 2a as compared to the element 27' of FIG. 2b is significant. The two electrode 50, 52 configuration of the optical control element 27 is useful at signal frequencies from dc to approximately 20 GHz. Due to the spacing of the electrodes 50, 52, however, the electric field induced in the electro-optic substrate 32 is correspondingly low. Thus, a higher signal voltage, $V_2$, is generally required to switch the optical state of the device 30. The three electrode 54, 56, 58 configuration is useful at a some-what smaller range of frequencies extending from dc to a maximum of approximately 1 GHz·cm (frequency·region II electrode length $L_2$ product). However, by the considerably closer electrode spacing afforded by the three electrode configuration, the necessary electric field strengths can be achieved at significantly lower applied signal voltage potentials.

A second embodiment of the present invention, optimized to operate as an optical filter, is shown in FIG. 3. The optical filter 70 is substantially similar, both in terms of structure and operation, to the optical switch 30 described above. The optical filter 70 differs significantly only in that the two optical channel waveguides 72, 74 have different physical dimensions and correspondingly different optical dispersion characteristics. In this respect, the optical filter 70 is analogous to the device shown in FIG. 1. The optical filter 70 further differs from the optical switch 30 of FIG. 2a in that it is shown with the three electrode 54, 56, 58 optical control element 27'. As with the optical switch 30, the optical filter 70 may utilize either of the electrode configurations as needed based on the operating characteristics of each configuration as discussed above.

The operation of the optical filter 70 is distinguished from that of the optical filter 30 in that only a relatively narrow band of frequencies, centered about a desired phase match wavelength, are affected. In order to properly understand the operation of the optical filter 70, consider Equations 1-8 with the assumption that the dc bias $|V_1|$ is properly selected in view of the particular dimensions of the waveguides 72, 74 and their optical properties, and that $|V_2|=0$ ($\Delta\phi=0$) such that a cross state occurs at a desired center wavelenth $\lambda_V$. Thus, wavelengths within a narrow frequency band centered about the wavelength $\lambda_V$ will be effectively cross stated. Wavelengths within sidelobe frequency bands will also be effectively cross stated, though at significantly lower cross state efficiencies. Naturally, it is desirable that the center frequency band be made as narrow as possible with a 100% cross over efficiency and that the side lobe frequency bands be made essentially nonexistent by having an extremely low cross over efficiency.

The filter function of the optical filter 70 is given by:

$$DD^* = [4A_1A_1{}^*B_1B_1{}^*] \cos^2(\Delta\phi') \qquad (9)$$

where $\Delta\phi'=(L_3\delta_2)$. The bracketed portion of Equation 9 is directly attributable to the $\Delta\beta$ reversal sections of regions I and III. The remaining term is contributed by Mach Zehnder interferometer section of region II.

Thus, in essence, the optical element of region II has a narrowband filter characteristic and is interposed between the optical elements of regions I and III, each having their own filter characteristic, such that the filter function of the optical device 70 is in essence the product of each separate filter characteristic. Thus, by selecting the filter characteristic of the element of region II, as easily and directly permitted by selecting $L_3$, to provide nulls in its operation ($\Delta\phi'=(2n+1)\cdot(\pi/2)$, where n is any integer greater than 0) at the sidelobe peaks in the operation of the characteristic provided by electrode pairs 25 and 26, a cross state filter having a narrow center bandwidth and with the sidelobes significantly reduced is provided.

Figure 6:
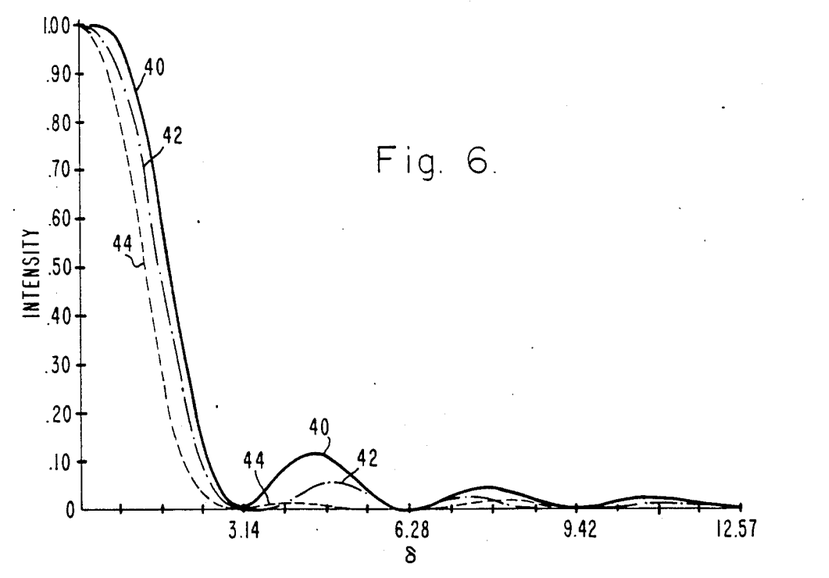
FIG. 6 is a graph illustrating the improved filter characteristics of the optical device of the present invention in comparison to a prior art filter.

This is illustrated in FIG. 6 with the crossover efficiency results obtained by computer modeling of the overall filter function (Equation 9) of the device 70. The ordinate is the normalized intensity response of the filter where the abscissa coordinate is the value of $\delta$, where $\delta=(\beta_1-\beta_2/2)$, $\beta_1$ and $\beta_2$ being the propagation constants for waveguides 72 and 74, respectively and wherein $\delta\simeq f(\lambda)$. At the crossover frequency $f_V=c/\lambda_V$, $\delta$ equals 0. Waveform 40 illustrates the filter response of the prior art device shown in FIG. 1. Waveforms 42 and 44 illustrate the filter response of the optical switch shown in FIG. 2 with the spacing $L_3$, waveform 42 representing the situation when spacing $L_3$ is approximately $\frac{1}{8}$ of the length of electrode pairs 25 and 26 ($L_3=\frac{1}{8}L_1$) and waveform 44 illustrating the filter response with the spacing $L_3$ approximately one-half of the length of electrode pairs 25 and 26 ($L_3=\frac{1}{2}L_1$). As can be observed, the filter bandwidth narrows as the spacing $L_3$ increases, the cross over efficiency associated with the sidelobes similarly decreasing, until an optimum length $L_3$, as specified above, is reached.

The filtering function provided by the device of the present invention is thus substantially more desirable than that of the prior art device of FIG. 1. In addition, the path of the incident light beam (crossover and parallel states) is separately and independently controlled by appropriate selection of $|V_2|$ (controlling $\delta_2$ and thus $\Delta\phi$). Thus, for example, for a light beam 35 having a single wavelength $\lambda \simeq \lambda_V$ and with $|V_2|=0$, light beam 35 will emerge from device 70 as cross state light beam 38. If a voltage $|V_2|$ is applied to electrodes 54 and 58, the emerging light beams will split into two beams 38 and 39 having an intensity related to the propagation difference $\delta_2$ and, thus, the relative phase difference $\Delta\phi$ between the two waveguides 72, 74 in region II. For a light beam 35 having a band of frequencies and with $|V_2|=|0$, those frequencies within the frequency band defined by the filter characteristic of FIG. 7, based on Equation 9 for the particular device 70, will switch to the cross state as beam 38 with an intensity also determined by the filter function characteristic. The portion of the frequencies not fully coupled to the cross state will emerge as light beam 39 (parallel state). The intensity of the cross and parallel state beams thus can be controlled by adjusting $|V_2|$ to a desired value. Thus, a switching and modulation function may be combined with an improved filtering function.

EXAMPLE

An optical switch in accordance with the first embodiment of the present invention was fabricated on a Z-cut LiNbO$_3$ substrate using 400 Å Ti diffused for eight hours at 1000° C. in a flowing H$_2$O:Ar atmosphere to form the waveguides. During the cooldown, the Ar was replaced with O$_2$ to reoxidize the LiNbO$_3$. As formed, the waveguides are 4 μm wide each, with G=3 μm and $L_1=1.5$ mm. The length $L_2$ is 6 mm, the length $L_3$ is 7 mm, and the waveguide separation in region II is 12 μm. A 2500 Å SiO$_2$ buffer layer was sputter-deposited on the LiNbO$_3$ before fabrication of the electrodes to eliminate the optical loss associated with the metal optical mode interactions. Aluminum electrodes were fabricated using conventional metal evaporation techniques. The optical control element electrodes are of the design configuration shown in FIG. 2b.

In the device, the dc bias $\Delta\beta$ reversal cross state voltages, $|V_1|$, for transverse electric and transverse magnetic (TE/TM) operation were 150 volts and 60 volts, respectively. Switching from the cross to parallel state occurred for TE/TM orientations with voltage $V_2$ applied in the range from 30 to 35 Vdc. The TE mode cross talk for both the parallel and cross states were −30 dB, the TM cross state cross talk was only −15 dB (in LiNbO$_3$, two different electromagnetic modes, the TE and TM modes, are propagated; thus device characteristics including switching voltages are slightly different).

The present invention thus provides a highly flexible optical waveguide device that can easily be fabricated in a single and cost effective manner as a discrete device or as part of an integrated optical circuit. The optical device of the present invention can be variously optimized so as to have the characteristics of an optical switch, optical modulator, and narrow pass-band optical filter. In all cases, the optical bandwidth of the device is directly determined by the optical properties of the substrate and waveguide materials and the dimensions of the waveguides, the center frequency of the optical filter and modulator embodiments being electrically adjustable in an accurate manner over a wavelength difference range typically of approximately 0.1 μm within a wavelength spectrum of 1 μm centered at approximately 1 μm for LiNbO$_3$. Various optical control element electrode configurations may be employed to permit a wide and continuous range of switching frequencies, from dc to high microwave (∼20 GHz), in all embodiments. Further, all embodiments characteristically have exceptionally low cross talk, the optical filter embodiments also having selectably narrow to very narrow pass bands with substantially reduced sidelobe characteristics.

It should be understood that the foregoing disclosure relates only to the preferred embodiments of the present invention. Based upon the above teachings, many modifications may be made without departing from the nature and scope of the present invention. These modifications may include, but are not limited to utilizing a different substrate material, such as GaAs or INGaAsP, a different waveguide composition or method of providing the optical waveguides such as formation by proton exchange, a different electrode metal, or a different electrode configuration design as may be appropriate for the provision of the various dc bias potentials and switch control signals consistent with the present invention. Therefore, within the scope of the appended claims, the present invention may be practiced otherwise than as specifically described.

What is claimed is:

1. An electro-optical device comprising:
   (a) an electro-optic substrate;
   (b) first and second optical channel waveguides provided at a surface of said substrate, said waveguides being generally parallel to one another, optically coupled in first and third regions of said device, and essentially optically isolated from one another in an interposed second region; and
   (c) first, second, and third sets of electrodes associated with said waveguides in said first, second, and third regions, respectively, of said device, said first and third electrode sets being biased so as to effectively transfer light energy between said first and second waveguides, said second electrode set being selectively biased so as to provide a proportionally corresponding relative phase difference in the light energy traveling in each of said waveguides such that light energy introduced into said first waveguide is effectively transferred in part to said second waveguide within said first region and such that light energy is effectively transferred between said first and second waveguides in said third region, the transfer taking place in a direction and at a magnitude directly dependent on said corresponding relative phase difference between light energy traveling in said second region of said device.

2. The device of claim 1 wherein said first, second, and third electrode sets are configured such that, by an application of their respective bias and signal voltage potentials, an electric field induced respective in each of said first, second, and third regions of said device has an opposite polarity with respect to each of said waveguides within a corresponding region of said device.

3. The device of claim 2 wherein said second set of electrodes is of a design configuration suitable for receiving high frequency signals.

4. The device of claim 3 wherein said first, second, and third electrode sets each comprise first and second electrodes, said first electrodes being associated with said first waveguide and said second electrodes being associated with said second waveguide.

5. The device of claim 4 wherein said second electrode set is further comprised of a third electrode.

6. The device of claim 4 wherein equal magnitude and opposite polarity bias potentials are applied to said first and third electrode sets, respectively, the bias potential magnitude being sufficient to provide for the effective transfer of one-half of the light energy within a given frequency range from said first waveguide to said second waveguide within said first region.

7. The device of claim 6 wherein the signal potential applied to said second electrode set is within a range corresponding to the provision of a relative phase difference of zero to a phase difference sufficient to cause the effective transfer of all of the light energy transferred in said first region to be transferred from said second waveguide to said first waveguide within said third region.

8. The device of claim 3 or 7 wherein said waveguides are of like dimensions and optical properties such that said device operates as an optical switch.

9. The device of claim 3 or 7 wherein said waveguides use different dimensions and correspondingly dissimilar optical properties such that said device operates as an optical filter.

10. The device of claim 3 or 7 wherein said substrate is comprised of lithium niobate.

11. The device of claim 10 wherein said waveguides are comprised of titanium.

12. The device of claim 11 wherein said electrodes are comprised of aluminum.

13. An electro-optical waveguide device comprising:
   (a) an electro-optic substrate;
   (b) a first waveguide having first, second, and third sections in said substrate;
   (c) a second waveguide having first, second, and third sections in said substrate, said first section of said first waveguide being arranged in spatial orientation with respect to said first section of said second waveguide such that the two waveguide sections are proximate each other over a first interaction length such that one-half of the light energy within a given frequency range supplied to said first waveguide is coupled to said second waveguide, said third sections of said first and second waveguides being arranged in spatial orientation such that the two waveguide sections are proximate each other over a second interaction length such that light energy within the given frequency range supplied to said first waveguide is coupled between said first and second waveguides;

(d) an optical control element associated with said second sections of said first and second waveguides and comprising a plurality of electrodes formed on the surface of said substrate; and (e) means for applying a signal voltage potential to said optical control element so as to provide a relative phase difference between light energy propagating through said second sections of said first and second waveguides, respectively, with the relative phase difference being determinative of a direction of and magnitude at which light energy is coupled between said third sections of said first and second waveguides, the frequency of said signal ranging between dc and microwave frequencies, with said signal voltage potential having a value ranging between voltage potentials coresponding to the coupling of all the light energy within the given frequency range from said third section of said first waveguide to the third section of said second waveguide and to the coupling of all light energy within the given frequency range from said third section of said second waveguide to the third section of said first waveguide.

14. The electro-optical device of claim 13 wherein said first and second interaction lengths are equal.

15. The electro-optical device of claim 13 wherein said substrate comprises lithium niobate and said first and second waveguides are defined in said substrate by the presence of titanium in said substrate.

16. The electro-optical device of claim 13 wherein said optical control element comprises first, second and third electrodes.

17. The electro-optical device of claim 13 wherein said control element electrodes comprise traveling wave electrodes.

* * * * *